United States Patent [19]

Kasahara et al.

[11] Patent Number: 5,487,417
[45] Date of Patent: Jan. 30, 1996

[54] ELECTROLYTE INJECTION APPARATUS

[75] Inventors: Shigeo Kasahara; Kiyoshi Sueoka; Gen Takayama; Shingo Satoh; Hidemi Houjyou, all of Tokyo, Japan

[73] Assignee: Toshiba Battery Co., Ltd., Tokyo, Japan

[21] Appl. No.: 298,679

[22] Filed: Aug. 31, 1994

[30] Foreign Application Priority Data

Sep. 3, 1993 [JP] Japan .................................. 5-219898
Aug. 9, 1994 [JP] Japan .................................. 6-187396

[51] Int. Cl.⁶ .................................................. H01M 4/82
[52] U.S. Cl. ............................... 141/32; 141/34; 141/65
[58] Field of Search .............................. 141/1.1, 32, 34, 141/65; 29/2, 623.1, 623.5, 730

[56] References Cited

U.S. PATENT DOCUMENTS

| | | | |
|---|---|---|---|
| 1,226,448 | 5/1917 | Bills | 141/34 X |
| 2,873,770 | 2/1959 | Young et al. | 141/32 |
| 4,832,096 | 5/1989 | Kohlbach | 141/65 X |
| 4,945,956 | 8/1990 | Bueyuekgueclue et al. | 141/65 X |
| 5,323,818 | 6/1994 | Yakubowski | 141/65 X |
| 5,337,794 | 8/1994 | Nishiyama et al. | 141/65 X |

FOREIGN PATENT DOCUMENTS

| | | | |
|---|---|---|---|
| 58-25080 | 2/1983 | Japan | 141/1.1 |
| 59-134558 | 8/1984 | Japan | |
| 62-139247 | 6/1987 | Japan | |
| 2-201869 | 8/1990 | Japan | |
| 1193959 | 6/1970 | United Kingdom | 141/1.1 |

Primary Examiner—J. Casimer Jacyna
Attorney, Agent, or Firm—Oblon, Spivak, McClelland, Maier & Neustadt

[57] ABSTRACT

This invention provides an electrolyte injection apparatus capable of injecting an electrolyte accurately into a battery which does not contain an electrolyte yet and in which an electrode group consisting of a laminated structure formed by interposing a separator between positive and negative electrodes is accommodated in a case such that a lamination plane of the electrode group is parallel to the direction of depth of the case. The electrolyte injection apparatus of this invention includes a rotary table, an electrolyte injection member supported by the rotary table so as to be tilted by a centrifugal force upon rotation of the rotary table, and the injection member further having an internal hole whose bottom section is tapered, and a small-diameter exit hole formed in a lower end thereof and communicating with the internal hole, a holding mechanism for holding the battery containing no electrolyte below the injection member such that the exit hole of the injection member is inserted into an opening portion of the case with a desired distance held between a lower opening portion of the exit hole and an upper end of the electrode group, and an electrolyte supply mechanism for supplying an electrolyte to the injection member.

15 Claims, 12 Drawing Sheets

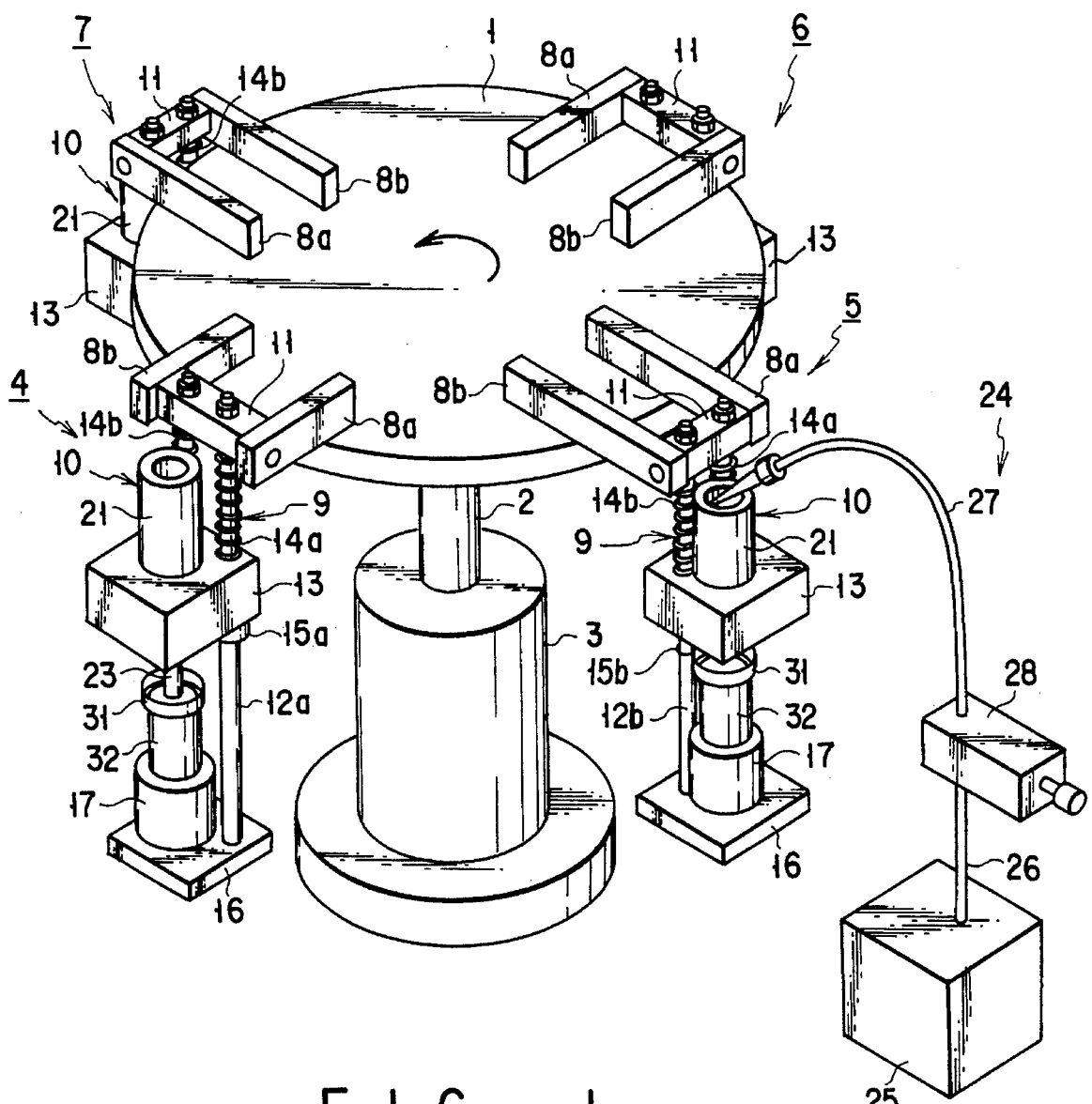
F I G. 1

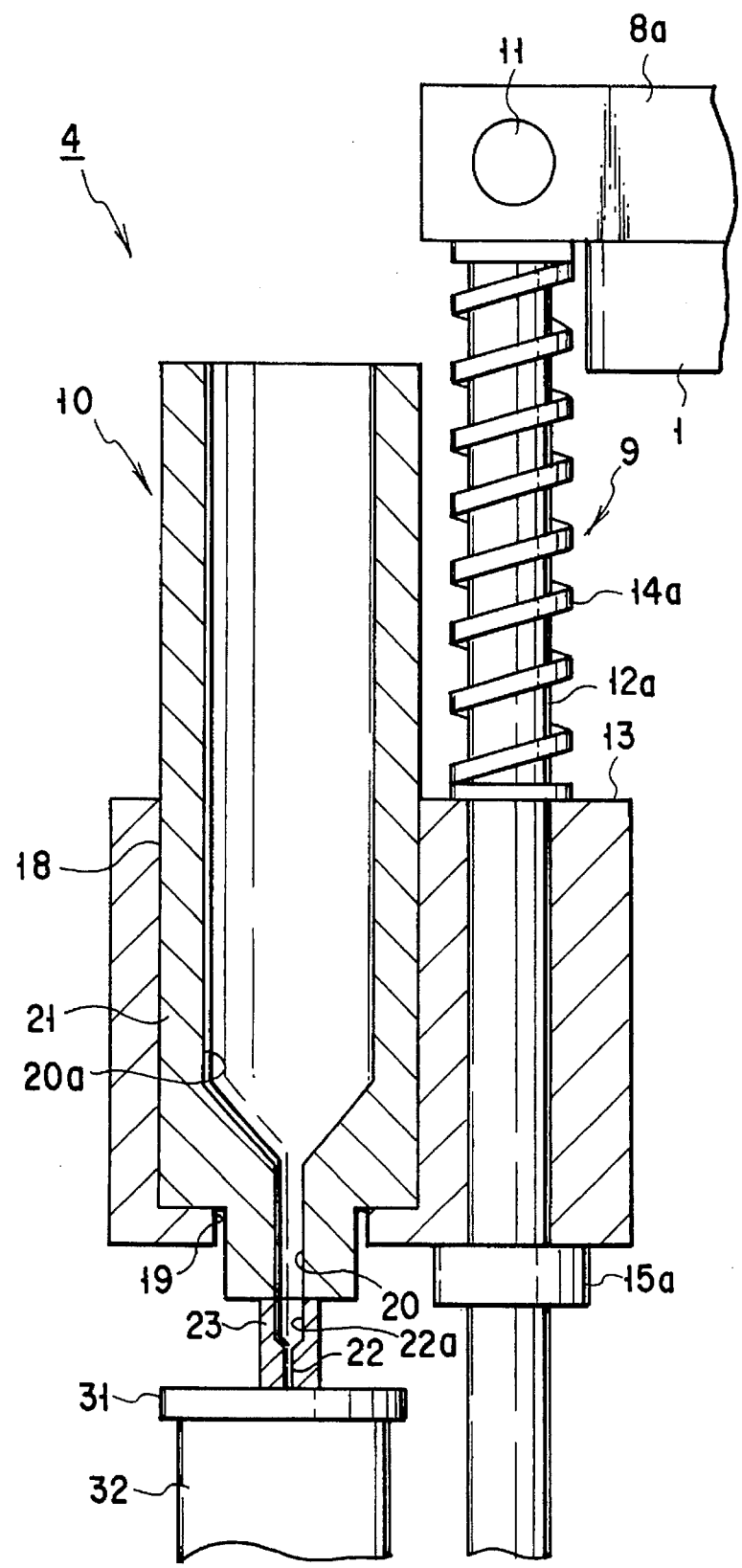
F I G. 2

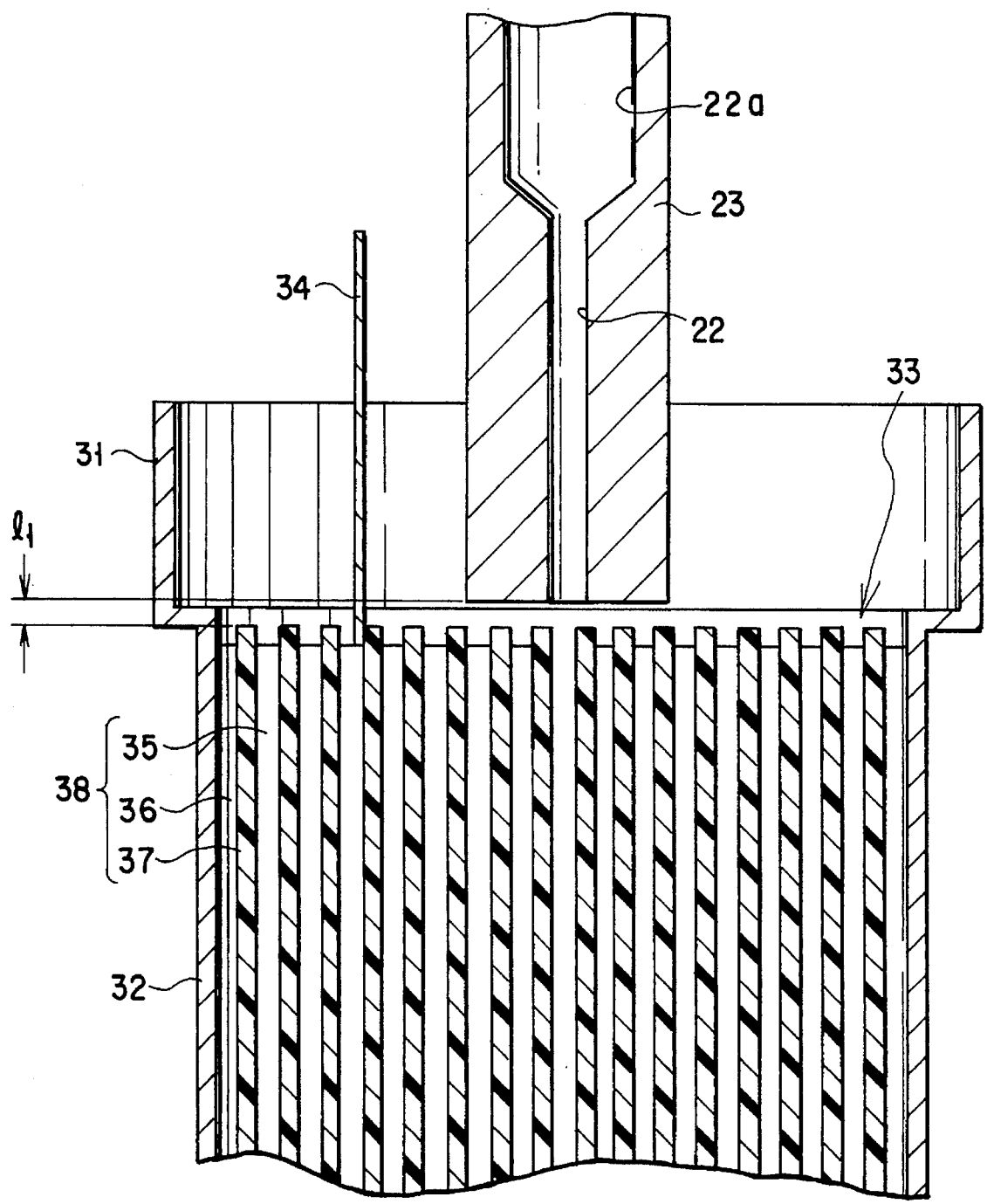
F I G. 4

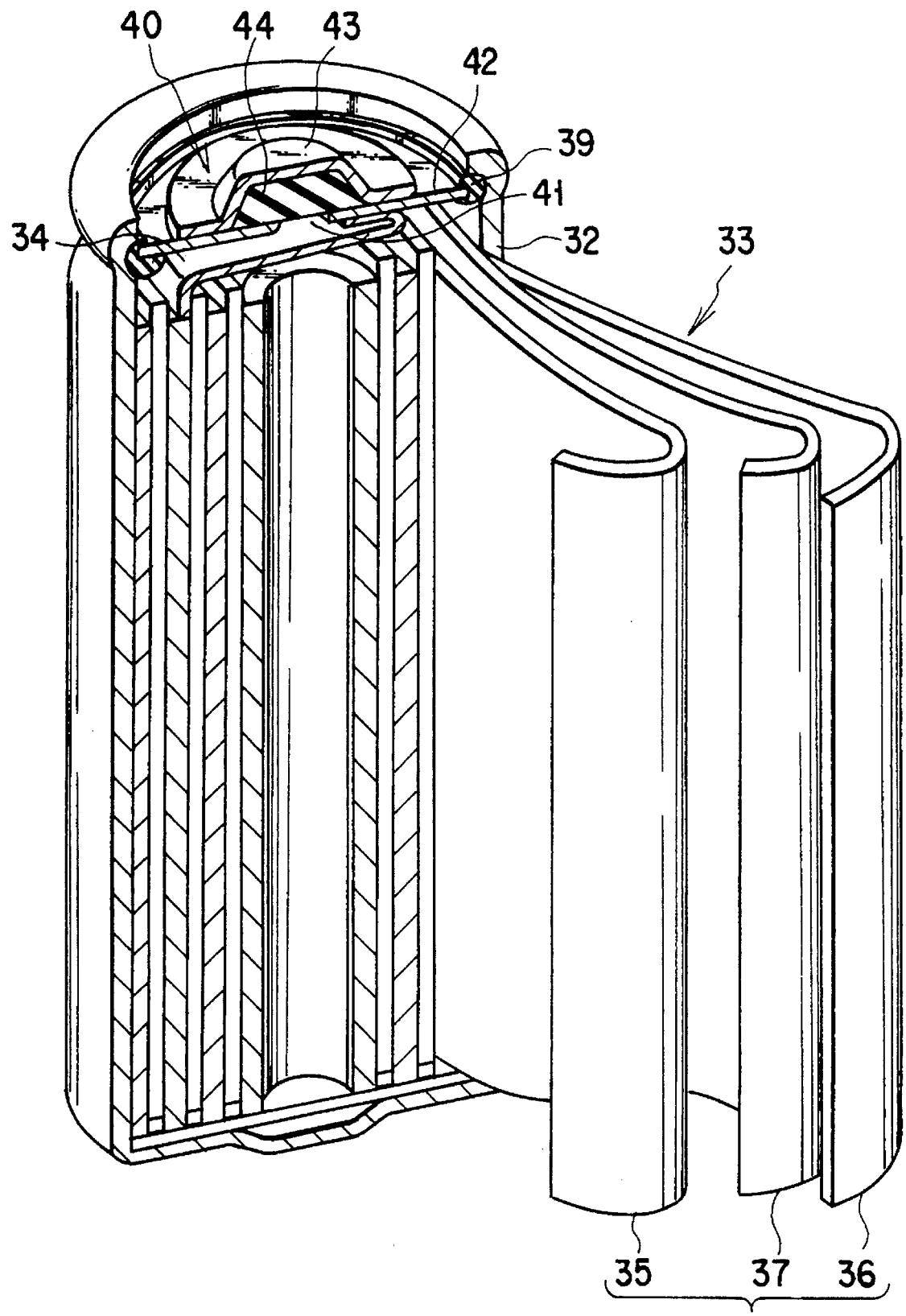
F I G. 6

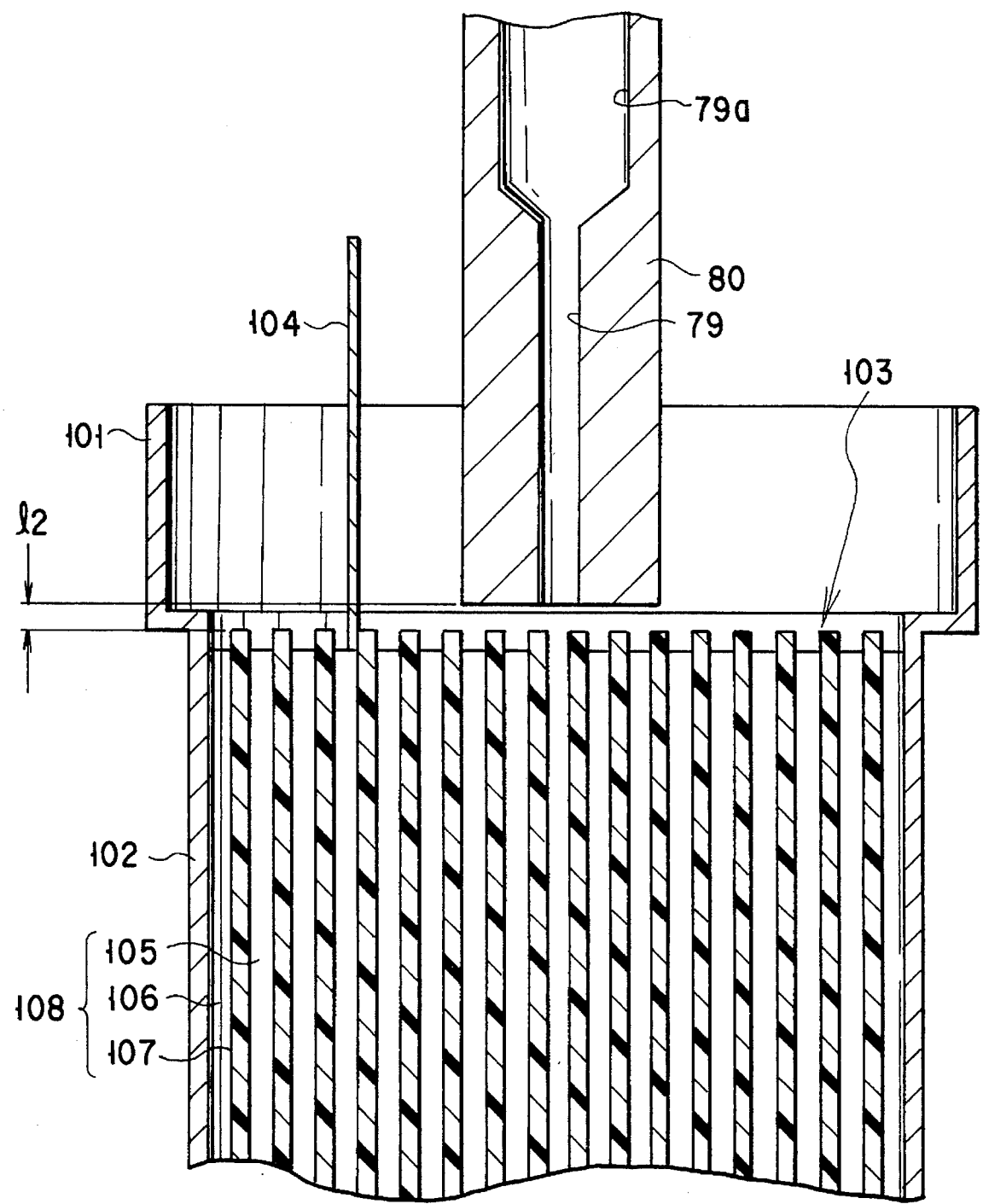
F I G. 10

ELECTROLYTE INJECTION APPARATUS

BACKGROUND OF THE INVENTION

1. Field of the Invention

The present invention relates to an electrolyte injection apparatus and, more particularly, to an electrolyte injection apparatus for injecting an electrolyte into a case of a battery by using a centrifugal force.

2. Description of the Related Art

Recently, to meet demands for high-performance, large-capacity batteries, various batteries such as alkaline secondary batteries and lithium ion secondary batteries have been developed and put into practical use. Alkaline secondary batteries are widely used because they can be manufactured at a lower cost, have a higher safety, and can discharge with a larger current than lithium ion secondary batteries. A nickel-cadmium secondary battery as one example of an alkaline secondary battery is manufactured by the following method. First, an electrode group is formed by winding a laminated structure obtained by interposing a separator consisting of polyamide fiber unwoven fabric between a positive electrode containing nickel hydroxide and a negative electrode containing cadmium oxide. This electrode group is accommodated in a cylindrical case, and an alkaline electrolyte is injected into the case. Thereafter, the opening portion of the case is sealed to complete a secondary battery. The alkaline electrolyte must be injected into the case with a high accuracy in respect of the cell performance.

Jpn. Pat. Appln. KOKAI Publication No. 59-134558 has disclosed an apparatus for injecting an alkaline electrolyte into the nickel-cadmium secondary battery which contains no electrolyte. This injection apparatus comprises two funnels, two supporting means for supporting the funnels respectively, and two holding means each for holding a case accommodating an electrode group. Each of the cases is located below one of the funnels. Each funnel having an exit hole is inserted into the opening portion of the corresponding case such that the exit hole is closed with the upper end of the electrode group. Each of the supporting means and each of the case holding means are suspended from both sides of a rotary bar.

In this apparatus, each case accommodating the electrode group is connected to the corresponding holding means, each of the funnel is connected to the corresponding supporting means. A predetermined amount of an alkaline electrolyte is supplied to both funnels. Subsequently, the rotary bar is rotated. By this rotation, a centrifugal force acts on each of the holding means, which assumes a horizontal position. Then, the electrolyte in the funnels is accelerated to the exit hole by the centrifugal force, and readily flows into the case. Consequently, the electrolyte is absorbed by the electrode group in the case.

A nickel-metal hydride secondary battery as another example of an alkaline secondary battery comprises a cylindrical case. An electrode group is housed in the case. The electrode group is made of a laminated structure obtained by interposing a separator consisting of, e.g., polyamide fiber unwoven fabric between a positive electrode containing, e.g., nickel hydroxide as an active substance and a negative electrode containing, e.g., a hydrogen-absorbing alloy as an active substance. The electrode group is formed, for example by spirally winding this laminated structure. An alkaline electrolyte is also contained in the case. It is considered that the electrolyte is injected into the case by using the above apparatus. However, when the case accommodating the electrode group with the above construction is incorporated into the apparatus and the exit hole of the funnel of the apparatus is closed with the upper end of the electrode group, the exit hole of the funnel is clogged up by the separator, and this makes it difficult to inject an alkaline electrolyte into the case.

SUMMARY OF THE INVENTION

It is an object of the present invention to provide an electrolyte injection apparatus capable of injecting an electrolyte accurately into a battery which contains no electrolyte and in which an electrode group consisting of a laminated structure formed by interposing a separator between positive and negative electrodes is accommodated in a case such that a lamination plane of the electrode group is parallel to the direction of depth of the case.

It is another object of the present invention to provide an electrolyte injection apparatus capable of injecting an electrolyte accurately within a short time period into a battery which contains no electrolyte and in which an electrode group consisting of a laminated structure formed by interposing a separator between positive and negative electrodes is accommodated in a case such that a lamination plane of the electrode group is parallel to the direction of depth of the case.

According to the present invention, there is provided an electrolyte injection apparatus for injecting an electrolyte into a battery which contains no electrolyte and in which an electrode group consisting of a laminated structure formed by interposing a separator between positive and negative electrodes is accommodated in a case such that a lamination plane of the electrode group is parallel to the direction of depth of the case. The injection apparatus comprises:

a rotary table;

an electrolyte injection member supported by the rotary table so as to be tilted by a centrifugal force upon rotation of the rotary table, and the electrolyte injection member further having an internal hole whose bottom section is tapered, and a small-diameter exit hole formed in a lower end thereof and communicating with the internal hole;

holding means for holding the battery containing no electrolyte below the injection member such that the exit hole of the injection member is inserted into an opening portion of the case with a desired distance held between a lower opening portion of the exit hole and an upper end of the electrode group, and electrolyte supply means for supplying an electrolyte to the injection member.

Also, according to the present invention, there is provided an electrolyte injection apparatus for injecting an electrolyte into a battery which contains no electrolyte and in which an electrode group consisting of a laminated structure formed by interposing a separator between positive and negative electrodes is accommodated in a case such that a lamination plane of the electrode group is parallel to the direction of depth of the case. The injection apparatus comprises:

a rotary table;

an electrolyte injection member supported by the rotary table so as to be tilted by a centrifugal force upon rotation of the rotary table, and the electrolyte injection member further having an internal hole whose bottom section is tapered, and a small-diameter exit hole formed in a lower end thereof and communicating with the internal hole;

opening/closing means for opening/closing the exit hole of the injection member;

holding means for holding the battery containing no electrolyte below the injection member such that the exit hole of the injection member is inserted into an opening portion of the case with a desired distance held between a lower opening portion of the exit hole and an upper end of the electrode group;

evacuating means for evacuating the case; and electrolyte supply means for supplying an electrolyte to the injection member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a perspective view showing an electrolyte injection apparatus in Example 1 of the present invention;

FIG. 2 is an enlarged sectional view showing major components of an electrolyte injection mechanism in FIG. 1;

FIG. 4 is a sectional view taken along the line IV—IV in FIG. 3;

FIG. 6 is a perspective view showing a nickel-metal hydride secondary battery as one example of a battery into which an electrolyte is injected by the electrolyte injection apparatus in FIG. 1;

FIG. 10 is a sectional view taken along the line X—X in FIG. 9;

Detailed Description of the Preferred Embodiments

Figure 3:
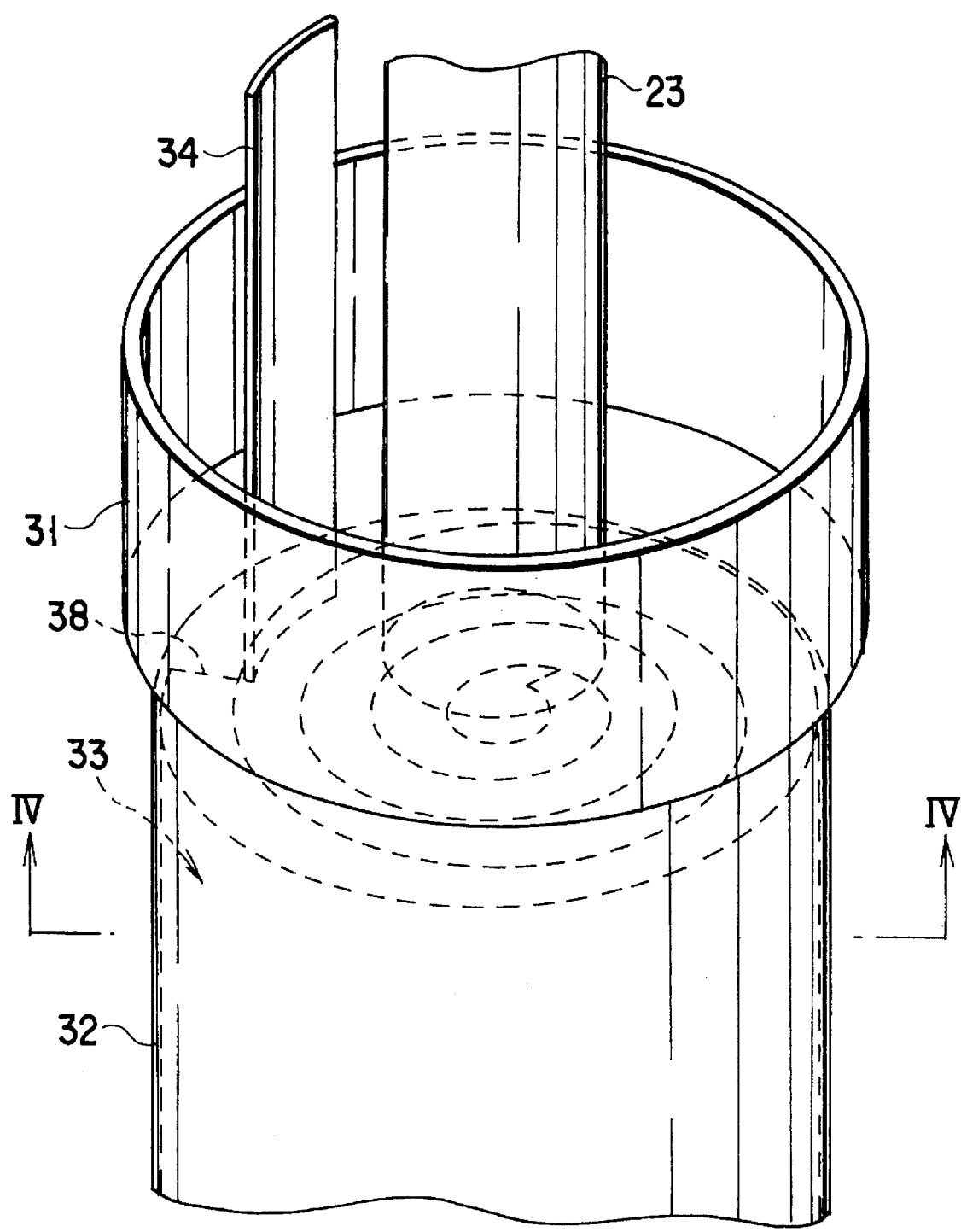
FIG. 3 is an enlarged perspective view showing the state in which a battery containing no electrolyte is held below an injection member in FIG. 1.

One electrolyte injection apparatus according to the present invention is an apparatus for injecting an electrolyte into a battery which contains no electrolyte and in which an electrode group consisting of a laminated structure formed by interposing a separator between positive and negative electrodes is accommodated in a case such that a lamination plane of the electrode group is parallel to the direction of depth of the case. The injection apparatus comprises:

a rotary table;

an electrolyte injection member supported by the rotary table so as to be tilted by a centrifugal force upon rotation of the rotary table, and the electrolyte injection member further having an internal hole whose bottom section is tapered, and a small-diameter exit hole formed in a lower end thereof and communicating with the internal hole;

holding means for holding the battery containing no electrolyte below the injection member such that the exit hole of the injection member is inserted into an opening portion of the case with a desired distance held between a lower opening portion of the exit hole and an upper end of the electrode group; and electrolyte supply means for supplying an electrolyte to the injection member.

An example of the battery into which an electrolyte is injected by the electrolyte injection apparatus of the present invention is a nickel-metal hydride secondary battery. In such secondary battery, the following materials are used as the positive electrode, the negative electrode, the separator, and the electrolyte.

As the positive electrode, an electrode containing nickel hydroxide as an active substance is used.

As the negative electrode, an electrode containing a hydrogen-absorbing alloy as an active substance is used.

As the separator, polyamide fiber unwoven fabric, or unwoven fabric made of polyolefin fiber having a hydrophilic functional group added such as polyethylene fiber, polypropylene fiber or mixture thereof is used. As a method of adding a hydrophilic functional group to polyolefin fiber, for example corona discharge, sulfonation, graft polymerization, or application of a surfactant is used.

Examples of the electrolyte are alkaline electrolyte such as a potassium hydroxide solution, a solution mixture of sodium hydroxide and lithium hydroxide, a solution mixture of potassium hydroxide and lithium hydroxide, and a solution mixture of potassium hydroxide, lithium hydroxide, and sodium hydroxide.

It is desirable that the distance between the lower opening portion of the exit hole of the injection member and the upper end of the electrode group be 0.5 to 1.0 mm for the reasons explained below. If the distance is smaller than 0.5 mm, the exit hole may be clogged up by the separator. If the distance is larger than 1.0 mm, the electrolyte contained in the injection member splashes to adhere to the inner surface of the upper opening portion of the case to contaminate the inner surface, in being injected into the case through the exit hole of the injection member. This may make it difficult to airtightly mount a sealing plate on the upper opening portion of the case. Also, in a nickel-metal hydride secondary battery in which a sealing lid group, which also performs the explosion-preventing function and acts as a terminal of the positive electrode, is fixed by caulking to the upper opening portion of a case, a sealing agent such as asphalt is coated on the inner surface of the upper opening portion in order to assure the airtightness. This sealing agent is coated on the inner surface prior to injecting an electrolyte. If the distance herein discussed exceeds 1.0 mm when an alkaline electrolyte is injected into such a case, the electrolyte contained in the injection member splashes to adhere to the sealing agent to make the sealing agent scale off the inner surface. This may disturb the airtightness of the battery.

In the electrolyte injection apparatus of the present invention, the case accommodating the electrode group is held below the injection member by the holding means. In addition, a desired distance is kept between the lower opening portion of the exit hole of the injection member and the upper end of the electrode group. This makes it possible to prevent the separator from clogging up the exit hole of the injection member. Consequently, when an electrolyte is supplied to the injection member by the electrolyte supply means and the rotary table is rotated, the electrolyte can be injected into the case with a high accuracy by a centrifugal force acting on the injection member and on the case upon rotation.

Furthermore, by setting the distance between the lower opening portion of the exit hole of the injection member and the upper end of the electrode group to 0.5 to 1.0 mm, it is possible not only to prevent clogging of the exit hole by the separator, it is also possible to avoid adhesion of the electrolyte contained in the injection member to the inner surface of the upper opening portion of the case occurring when the electrolyte splashes while being injected into the case through the exit hole of the injection member with certainty.

A second electrolyte injection apparatus according to the present invention is an apparatus for injecting an electrolyte into a battery which contains no electrolyte and in which an electrode group consisting of a laminated structure formed by interposing a separator between positive and negative electrodes is accommodated in a case such that a lamination plane of the electrode group is parallel to the direction of depth of the case. The injection apparatus comprises:

a rotary table;

an electrolyte injection member supported by the rotary table so as to be tilted by a centrifugal force upon rotation of the rotary table, and the electrolyte injection member further having an internal hole whose bottom section is tapered, and a small-diameter exit hole formed in a lower end thereof and communicating with the internal hole;

opening/closing means for opening/closing the exit hole of the injection member;

holding means for holding the battery containing no electrolyte below the injection member such that the exit hole of the injection member is inserted into an opening portion of a case with a desired distance held between a lower opening portion of the exit hole and an upper end of the electrode group;

evacuating means for evacuating the case; and electrolyte supply means for supplying an electrolyte to the injection member.

An example of the battery into which an electrolyte is injected by this electrolyte injection apparatus of the present invention is a nickel-metal hydride secondary battery. The positive electrode, the negative electrode, the separator, and the electrolyte can be the same as mentioned above.

The distance between the lower opening portion of the exit hole of the injection member and the upper end of the electrode group is desirably 0.5 to 1.0 mm for the same reasons as described above.

This electrolyte injection apparatus of the present invention can inject an electrolyte into a battery containing no electrolyte at a higher accuracy within a shorter time period than the former electrolyte injection apparatus of the present invention discussed earlier.

That is, a separator constructed from polyamide fiber unwoven fabric is readily susceptible to oxidative, although it is highly hydrophilic, so a nickel-metal hydride secondary battery including this separator is poor in self-discharge characteristics. For this reason, it is common practice to use a material formed by adding a hydrophilic functional group to polyolefin fiber unwoven fabric with a high oxidation resistance, as the separator. In addition, the volume of the electrode group accommodated in the case of the secondary battery increases in order to increase the capacity of the battery. However, the separator consisting of the polyolefin fiber unwoven fabric having hydrophobic added with a hydrophilic functional group is slightly inferior in hydrophilic nature to the separator made from the polyamide fiber unwoven fabric. Also, the increase of the volume of the electrode group accommodated in the case decreases the free space of the case, making it difficult for the electrode group to absorb the electrolyte. Therefore, even if a case accommodating an electrode group with the above construction is incorporated into the former electrolyte injection apparatus of the present invention and an electrolyte contained in the injection member is injected by a centrifugal force acting on the case, it may become difficult to make the electrolyte penetrate into the electrode group.

The exit hole of the injection member is normally open in the former electrolyte injection apparatus of the present invention. Therefore, if the injection member is left unused for some time with an electrolyte contained in it, the electrolyte leaks from the exit hole. It is difficult for the leaked electrolyte to penetrate into the above-mentioned electrode group accommodated in the case. Therefore, the leaked electrolyte is not completely absorbed by the electrode group but partially collects on the electrode group in some cases. If the rotary table is rotated in this state, the electrolyte collected on the electrode group may be scattered to the outside. This may decrease the amount of the electrolyte contained in the case, resulting in a low accuracy.

In the latter electrolyte injection apparatus of the present invention, a case accommodating the electrode group with the above construction is held below the injection member by the holding means. In addition, the case and the injection member are so arranged that a desired distance is kept between the lower opening portion of the exit hole of the injection member and the upper end of the electrode group. While the exit hole of the injection member is closed by the opening/closing means, the case is evacuated by the evacuating means, and the electrolyte supply means supplies an electrolyte to the injection member. Therefore, the electrolyte contained in the injection member remains in the injection member without leaking from the exit hole of the injection member. In this state, the rotary table is rotated, and the exit hole of the injection member is opened at the time a centrifugal force acts on the injection member and the case. Consequently, since the negative pressure is in the case and the centrifugal force is acting on the case, the electrolyte contained in the injection member smoothly and rapidly penetrates into the electrode group through the exit hole. Therefore, it is possible to inject the electrolyte contained in the injection member into the case accommodating the electrode group at a higher accuracy within a shorter time period. As a consequence, the efficiency of the electrolyte injection operation is improved, resulting in an improved productivity of the batteries.

The present invention will be described in more detail below by way of its preferred examples with reference to the accompanying drawings.

EXAMPLE 1

An electrolyte injection apparatus of Example 1 will be described below with reference to FIGS. 1 and 2.

As shown in FIG. 1, the upper end of a rotating shaft 2 is axially fixed to a disk 1. A bearing 3 engages with the rotating shaft 2 and rotates together with the rotating shaft 2 when the rotating shaft 2 rotates. This allows a smooth rotation of the rotating shaft 2. A motor (not shown) is arranged below the bearing 3, and a bevel gear (not shown) is fitted on the driving shaft of the motor. A bevel gear (not shown) fitted on the lower end of the rotating shaft 2 is meshed with the bevel gear of the driving shaft. When the motor is rotated intermittently or continuously, the driving shaft, the two bevel gears, and the rotating shaft 2 are also rotated intermittently or continuously. This rotates the disk 1 intermittently or continuously.

First, second, third, and fourth electrolyte injection mechanisms 4, 5, 6, and 7 are arranged on the same circumference of the disk 1 at equal angular intervals of, e.g., 90°. Each of the electrolyte injection mechanisms 4 to 7 includes two support rods 8a and 8b, a holding means 9 for holding a battery containing no electrolyte, and an electrolyte injection member 10.

The two support rods 8a and 8b are arranged parallel to each other with a predetermined distance between them. The ends on one side of the support rods 8a and 8b are fixed on the same circumference of the disk 1 at equal angular intervals of 90°. A driving rod 11 is rotatably, axially supported between the two support rods 8a and 8b.

As in FIGS. 1 and 2, the holding means 9 for holding a battery containing no electrolyte includes two guide bars 12a and 12b, an injection member holder 13, two coil springs 14a and 14b, two holder stoppers 15a and 15b, a support plate 16, and a battery housing member 17. The upper ends of the two guide bars 12a and 12b are axially fixed to the driving rod 11 such that the guide bars 12a and 12b are parallel to each other. The lower ends of the guide bars 12a and 12b are fixed to the support plate 16. The two holder stoppers 15a and 15b have a larger diameter than that of the guide bars 12a and 12b and are fitted on the guide bars 12a and 12b, respectively. The guide bars 12a and 12b pass through the injection member holder 13 such that the lower end of the injection member holder 13 abuts against the holder stoppers 15a and 15b. The injection member holder 13 has an upper large-diameter columnar hollow portion 18 and a lower small-diameter columnar hollow portion 19. The two coil springs 14a and 14b are arranged between the lower surface of the driving rod 11 and the upper surface of the holder 13. The housing member 17 is a cylindrical vessel arranged on the support plate 16.

The injection member 10 consists of a funnel 21 including a nozzle 23 located at the lower end of the funnel 21. The funnel 21 and the nozzle 23 have internal holes 20a and 22a, respectively, and each of the holes 20a and 22a is tapered at the lower end. The funnel 21 and the nozzle 23 also have small-diameter exit holes 20 and 22, respectively. The exit holes 20 and 22 communicate with internal holes 20a and 22a, respectively. The exit hole 20 and the internal hole 22a communicate with each other. The injection member 10 is inserted into the hollow portion 18 of the holder 13.

An electrolyte supply means 24 is arranged behind, e.g., the electrolyte injection mechanism 5, as in FIG. 1. The electrolyte supply means 24 is constituted by an electrolyte storage tank 25, an electrolyte suction pipe 26 whose lower end is dipped in the electrolyte storage tank 25, an injection pipe 27 to the distal end of which a nozzle is connected, and a constant delivery pump 28 arranged between the suction pipe 26 and the injection pipe 27. In the electrolyte supply means with this arrangement, a predetermined amount of an electrolyte stored in the storage tank 25 is sucked up by the suction pipe 26 upon driving of the pump 28. The sucked electrolyte is supplied to the injection pipe 27 and then to the funnel 21 of the injection member 10 from the nozzle of the injection pipe 27.

Figure 5:
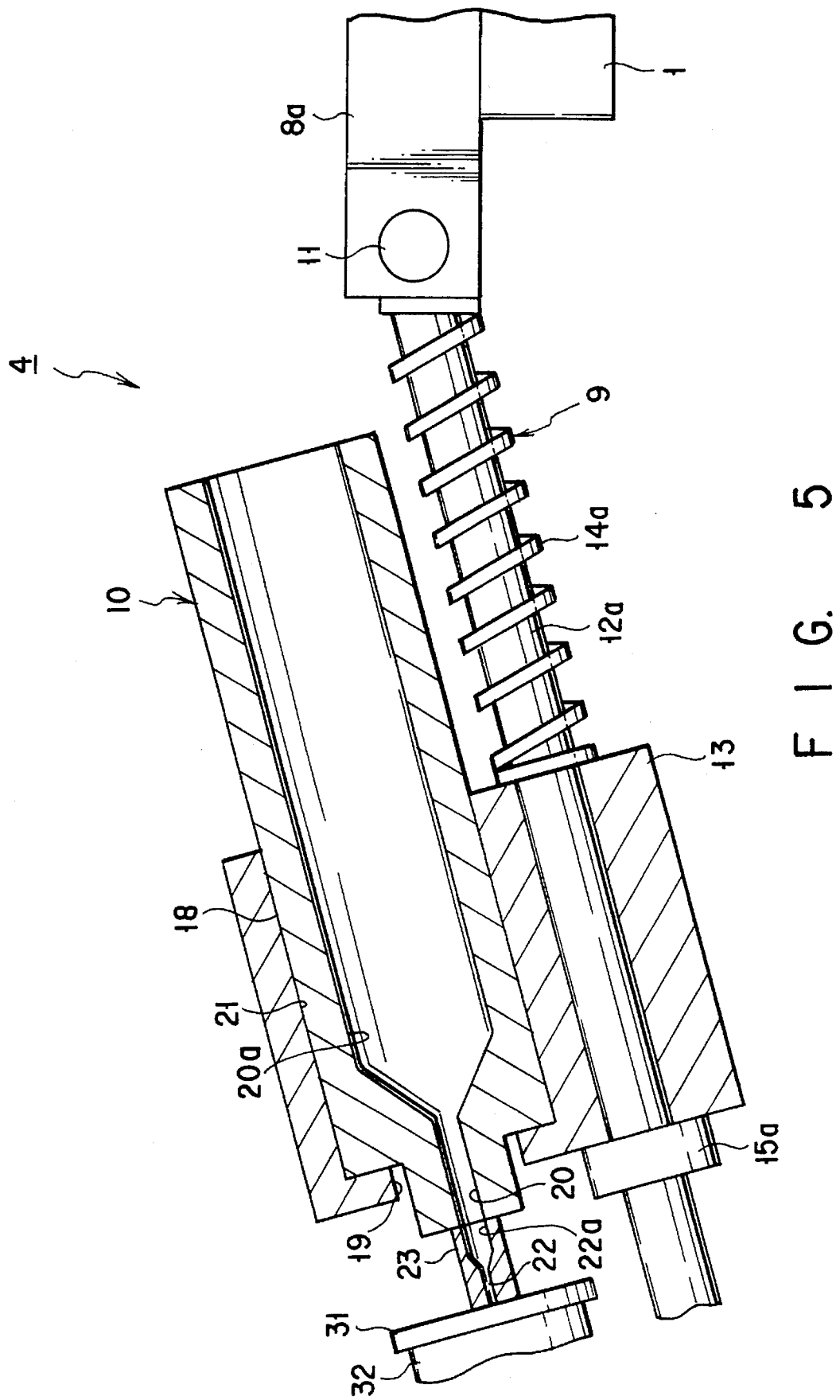
FIG. 5 is an enlarged sectional view for explaining the operation of the electrolyte injection apparatus in FIG. 1.

The operation of the electrolyte injection apparatus with the above arrangement will be described below with reference to FIGS. 1 and 2 already discussed above and FIGS. 3 to 5.

First, nickel-metal hydride secondary batteries which contain no electrolyte were prepared. As in FIGS. 3 and 4, each nickel-metal hydride secondary battery has a structure in which an electrode group 33 is accommodated in a cylindrical metal case 32 having a jutted portion 31 in the upper opening portion, and an asphalt sealing agent is coated on the inner surface of the jutted portion 31. The electrode group 33 is made of a laminated structure 38 constituted by a positive electrode 35 connected to one end of a lead wire 34 and containing nickel hydroxide as an active substance, a negative electrode 36 containing a hydrogen-absorbing alloy as an active substance, and a separator 37 (consisting of polyamide fiber unwoven fabric) interposed between the positive and negative electrodes 35 and 36. The electrode group 33 is formed by spirally winding this laminated structure 38.

Each secondary battery containing no electrolyte is housed in the housing member 17 of the holding means 9. The holder 13 of the holding means 9 of each of the electrolyte injection mechanisms 4 to 7 is pulled up along the two guide bars 12a and 12b against the biasing force of the two coil springs 14a and 14b, placing the housing member 17 housing the secondary battery containing no electrolyte on the support plate 16. Thereafter, the force for pulling up the holder 13 is removed. Consequently, the holder 13 is biased downward by the two coil springs 14a and 14b and abuts against the two stoppers 15a and 15b, as in FIG. 2. Therefore, as in FIGS. 3 and 4, the lower opening portion of the exit hole 22 of the nozzle 23 of the injection member 10 is positioned apart from the upper end of the electrode group 33 by a distance $l_1$ (e.g., 0.5 mm). This makes it possible to prevent the separator 37 from clogging up the exit hole 22 of the nozzle 23.

As illustrated in FIG. 1 mentioned above, the nozzle of the electrolyte supply means 24 is inserted into the opening portion of the funnel 21 of the electrolyte injection mechanism 5 to supply an alkaline electrolyte consisting of potassium hydroxide to the funnel 21. Subsequently, the disk 1 is rotated, e.g., counterclockwise intermittently by 90° each time to insert the nozzle of the electrolyte supply means 24 into the opening portions of the funnels 21 of the electrolyte injection mechanisms 4, 7, and 6 in this order, thereby supplying the alkaline electrolyte to each funnel 21.

When the holding of the secondary battery containing no electrolyte and the supply of the alkaline electrolyte to the injection members 10 are completed as described above, the disk 1 is rotated continuously. As the rotating speed increases, a centrifugal force acts more and more on the injection member 10 and the case 32 of each of the electrolyte injection mechanisms 4 to 7. As a consequence, each injection member 10 is so tilted as to be separated away from the disk 1 and assumes a nearly horizontal position as in FIG. 5. At this time, the alkaline electrolyte contained in the funnel 21 penetrates into the electrode group 33 through the exit hole 20, the internal hole 22a, and the exit hole 22. Therefore, a predetermined amount of the alkaline electrolyte is injected into each secondary battery at a high accuracy. During the injection, splash of the alkaline electrolyte passing through the exit hole 22 is prevented, and this avoids adhesion of the alkaline electrolyte to the sealing agent coated on the inner surface of the jutted portion 31.

When the rotating velocity of the disk 1 is decreased gradually after the injection of the alkaline electrolyte, the centrifugal force acting on the electrolyte injection mechanisms 4 to 7 weakens slowly. Accordingly, the mechanisms 4 to 7 are gradually over downward to return to the state in which each mechanism is suspended from the two support rods 8a and 8b of the disk 1 as in FIG. 1.

When the injection of the electrolyte is completed, the holder 13 of each of the electrolyte injection mechanisms 4 to 7 is pulled up along the two guide bars 12a and 12b, and the housing members 17 housing the secondary batteries supplied with the electrolyte are collected.

Each secondary battery removed from the apparatus and already supplied with the electrolyte was used to assemble a nickel-metal hydride secondary battery. More specifically, as shown in FIG. 6, a ring-like insulating gasket 39 was placed on the lower end of the jutted portion 31, a sealing lid group 40, which also performs the explosion-preventing function and acts as a terminal of the positive electrode, was placed on the insulating gasket 39, and the sealing lid group 40 was airtightly mounted on the case 32 by caulking. The sealing lid group 40 in FIG. 6 includes a circular sealing plate 42, a hat-like positive terminal 43, and a rubber safety valve 44. The sealing plate 42 has a hole 41 in the center, and the positive terminal 43 is so mounted on the sealing plate 42 as to cover the hole 41. The safety valve 44 is arranged in the space enclosed by the sealing plate 42 and the positive terminal 43 so as to close the hole 41. The other end of the positive lead 34 is connected to the lower surface of the sealing plate 42.

The electrolyte injection apparatus with the above construction can inject a predetermined amount of the electrolyte accurately into the case 32. Also, it is possible to avoid splash of the electrolyte contained in the funnel 21 and adhesion of the electrolyte to the sealing agent coated on the inner surface of the jutted portion 31 when the electrolyte is injected into the case 32 through the exit hole 22 of the nozzle 23. Consequently, it is possible to improve the airtightness of the battery assembled by the above-mentioned method after the electrolyte is injected, resulting in an improved reliability of the battery.

EXAMPLE 2

An electrolyte injection apparatus of Example 2 will be described below with reference to FIGS. 7 and 8.

Figure 7:
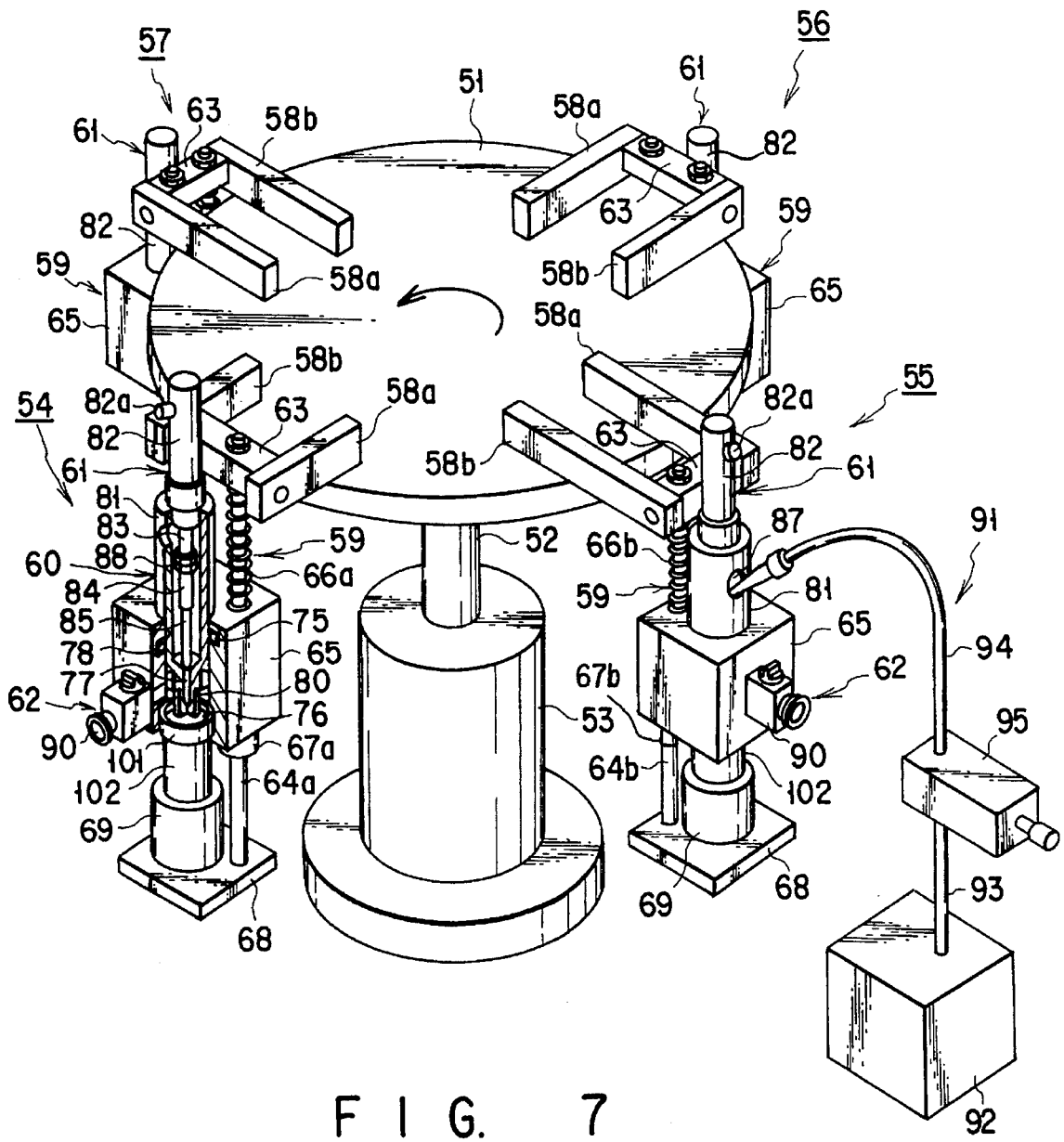
FIG. 7 is a perspective view showing an electrolyte injection apparatus in Example 2 of the present invention.

As shown in FIG. 7, the upper end of a rotating shaft 52 is axially fixed to a disk 51. A bearing 53 engages with the rotating shaft 52 and rotates together with the rotating shaft 52 when the rotating shaft 52 rotates. This permits a smooth rotation of the rotating shaft 52. A motor (not shown) is arranged below the bearing 53, and a bevel gear (not shown) is fitted on the driving shaft of the motor. A bevel gear (not shown) fitted on the lower end of the rotating shaft 52 is meshed with the bevel gear of the driving shaft. When the motor is rotated intermittently or continuously, the driving shaft, the two bevel gears, and the rotating shaft 52 are also rotated intermittently or continuously. This rotates the disk 51 intermittently or continuously.

First, second, third, and fourth electrolyte injection mechanisms 54, 55, 56, and 57 are arranged on the same circumference of the disk 51 at equal angular intervals of, e.g., 90°. Each of the electrolyte injection mechanisms 54 to 57 includes two support rods 58a and 58b, a holding means 59 for holding a battery containing no electrolyte, an electrolyte injection member 60, an opening/closing means 61, and an evacuating means 62.

The two support rods 58a and 58b are arranged parallel to each other with a predetermined distance between them. The ends on one side of the support rods 58a and 58b are fixed on the same circumference of the disk 51 at equal angular intervals of 90°. A driving rod 63 is rotatably, axially supported between the two support rods 58a and 58b.

Figure 8:
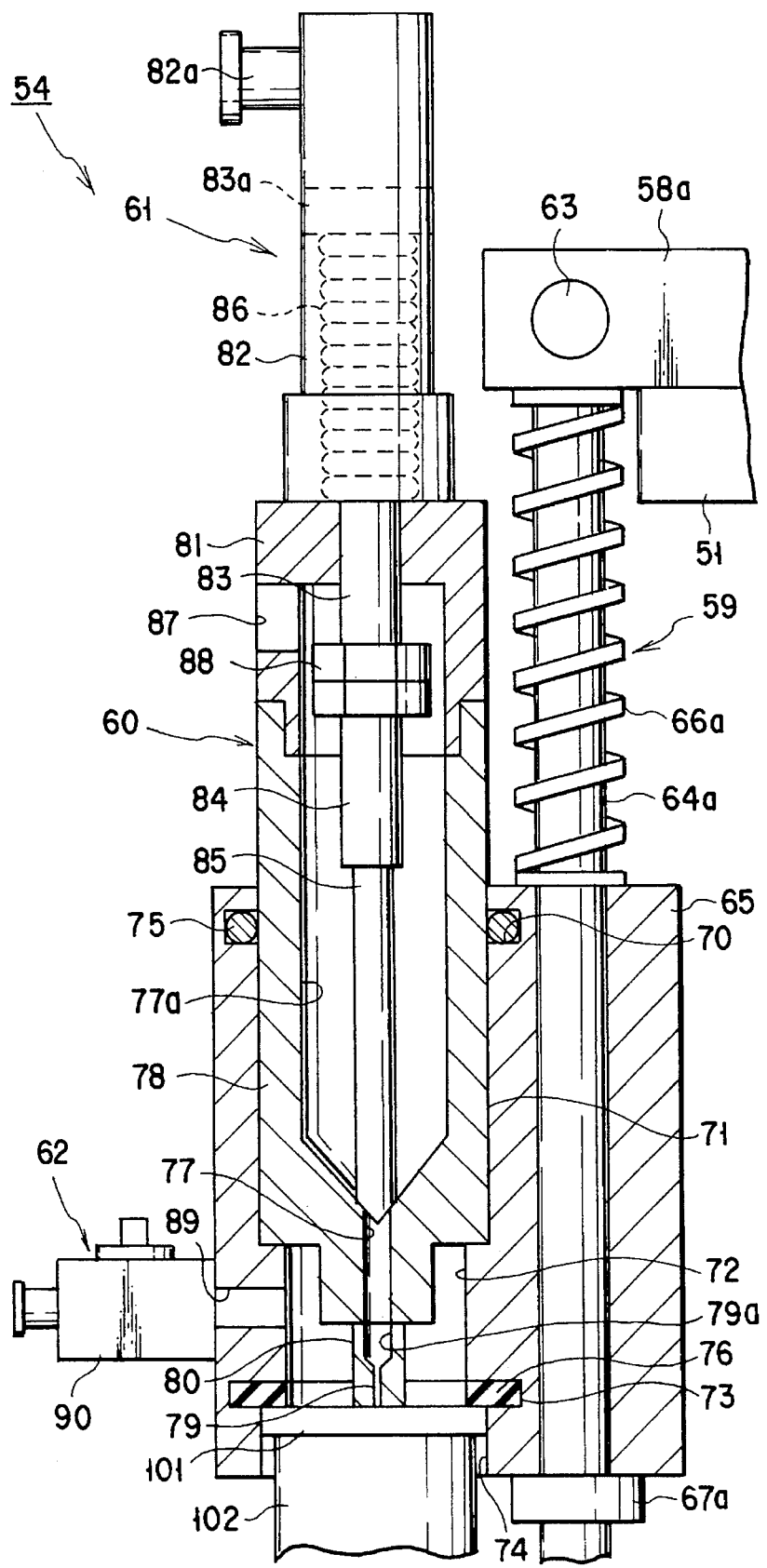
FIG. 8 is an enlarged sectional view showing major components of an electrolyte injection mechanism in FIG. 7.

As in FIGS. 7 and 8, the holding means 59 for holding a battery containing no electrolyte includes two guide bars 64a and 64b, an injection member holder 65, two coil springs 66a and 66b, two holder stoppers 67a and 67b, a support plate 68, and a battery housing member 69. The upper ends of the two guide bars 64a and 64b are axially fixed to the driving rod 63 such that the guide bars 64a and 64b are parallel to each other. The lower ends of the guide bars 64a and 64b are fixed to the support plate 68. The two holder stoppers 67a and 67b have a larger diameter than that of the guide bars 64a and 64b and are fitted on the guide bars 64a and 64b, respectively. The guide bars 64a and 64b pass through the injection member holder 65 such that the lower end of the injection member holder 65 abuts against the holder stoppers 67a and 67b. The injection member holder 65 has a first columnar hollow portion 71 having a first ring-like recessed portion 70 in the upper circumferential surface portion, and a second columnar hollow portion 72 formed at the lower end of the hollow portion 71 and having a diameter smaller than that of the hollow portion 71. The injection member holder 65 further has a second ring-like recessed portion 73 formed in the lower circumferential surface portion of the hollow portion 72, and a fourth columnar hollow portion 74 formed at the lower end of the hollow portion 72 and having a diameter smaller than that of the recessed portion 73 and larger than that of a jutted portion of a case (later described). An 0-ring 75 is engaged in the recessed portion 70. A ring-like packing 76 is engaged in the recessed portion 73. The two coil springs 66a and 66b are arranged between the lower surface of the driving rod 63 and the upper surface of the holder 65 to bias the holder 65 downward. The housing member 69 is a cylindrical vessel arranged on the support plate 68.

The injection member 60 consists of a funnel 78 including a nozzle 80 located at the lower end of the funnel 78. The funnel 78 and the nozzle 80 have internal holes 77a and 79a, respectively, and each of the holes 77a and 79a is tapered at the lower end. The funnel 78 and the nozzle 80 also have small-diameter exit holes 77 and 79, respectively. The exit holes 77 and 79 communicate with internal holes 77a and 79a, respectively. The exit hole 77 and the internal hole 79a communicate with each other. The lower portion of the injection member 60 is inserted into the hollow portion 71 of the holder 65.

The opening/closing means 61 includes a guide 81, a cylinder 82 having an air supply pipe 82a at the upper portion and an exhaust hole (not shown) at the lower portion, a piston 83 having an upper flange portion 83a, a tapered pin 85 having an upper flange portion 84 and a tapered portion at the lower end, a coil spring 86, and driving member (not shown). The guide 81 is cylindrical, has a nozzle insertion hole 87 on the side wall, and is attached to the upper end of the funnel 78. The cylinder 82 is attached to the upper end of the guide 81. The lower end of the piston 83 passes through the guide 81. The piston 83 vertically reciprocates in the cylinder 82. The tapered portion of the tapered pin 85 can be inserted, at its lower end, into the exit hole 77 of the funnel 78, and the flange portion 84 of the tapered pin 85 is coupled with the lower end of the piston 83 by a nut 88. The driving member is connected to the air supply pipe 82a. In this opening/closing means 61, when the air is supplied into the cylinder 82 through the air supply pipe 82a and then exhausted through the exhaust hole upon driving of the driving member, the piston 83 is moved down against the biasing force of the coil spring 86. Accordingly, the tapered pin 85 is moved down. Consequently, the tapered portion of the tapered pin 85 is inserted into the exit hole 77 Of the funnel 78 to close the exit hole 77. On the other hand, when the driving member is driven, reducing the air pressure in the cylinder 82 to atmospheric pressure, the coil spring 86 extends to bias the piston 83 upward. Accordingly, the tapered pin 85 is moved up. Consequently, the tapered portion of the tapered pin 85 is removed from the exit hole 77 of the funnel 78 to open the exit hole 77.

The evacuating means 62 includes an exhaust pipe 89, a valve 90, and a vacuum pump (not shown). The exhaust pipe 89 is formed at the end of the holder 65 of the holding means 59 so as to communicate with the hollow portion 72. The valve 90 is connected to the exhaust pipe 89, and the vacuum pump is connected to the valve 90.

An electrolyte supply means 91 is arranged behind, e.g., the electrolyte injection mechanism 55, as in FIG. 7. The electrolyte supply means 91 is constituted by an electrolyte storage tank 92, an electrolyte suction pipe 93 whose lower end is dipped in the electrolyte storage tank 92, an injection pipe 94 to the distal end of which a nozzle is connected, and a constant delivery pump 95 arranged between the suction pipe 93 and the injection pipe 94. In the electrolyte supply means with this arrangement, a predetermined amount of an electrolyte stored in the storage tank 92 is sucked up by the suction pipe 93 upon driving of the pump 95. The sucked electrolyte is supplied to the injection pipe 94 and then to the funnel 78 of the injection member 60 from the nozzle of the injection pipe 94.

Figure 9:
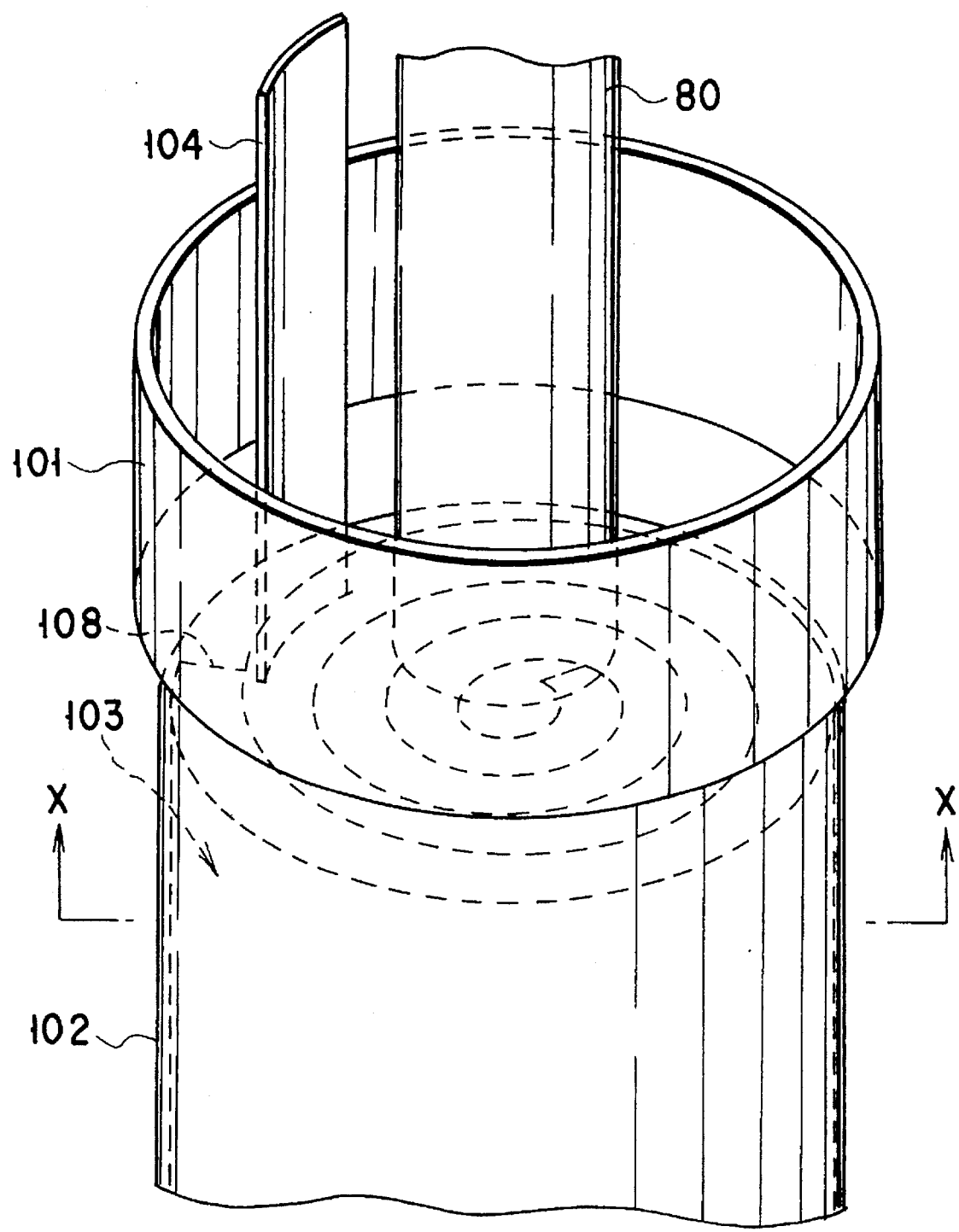
FIG. 9 is an enlarged perspective view showing the state in which a battery containing no electrolyte is held below an injection member in FIG. 7.
Figure 11:
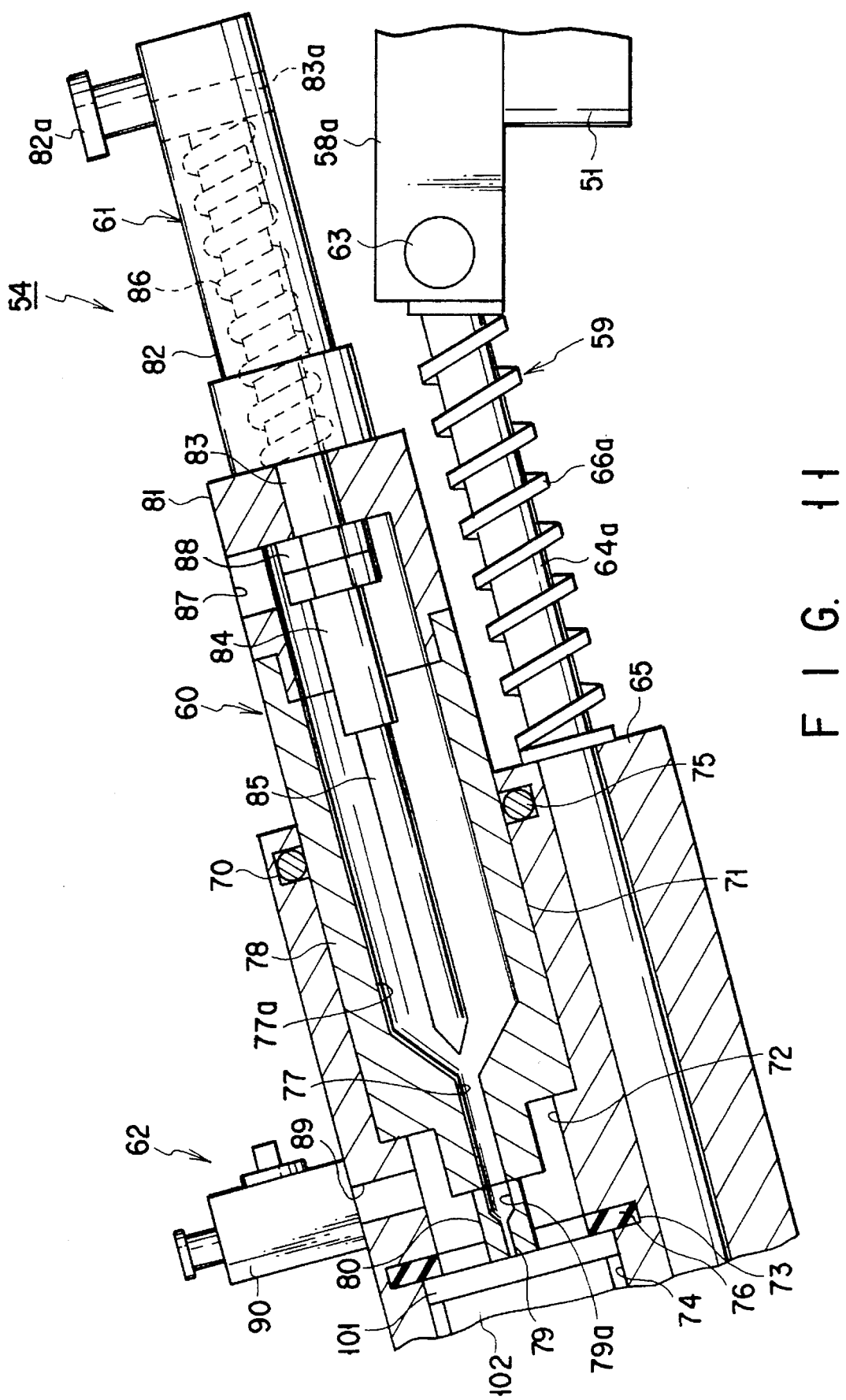
FIG. 11 is an enlarged sectional view for explaining the operation of the electrolyte injection apparatus in FIG. 7.

The operation of the electrolyte injection apparatus with the above arrangement will be described below with reference to FIGS. 7 and 8 already discussed above and FIGS. 9 to 11.

First, nickel-metal hydride secondary batteries which contain no electrolyte were prepared. As in FIGS. 9 and 10, each nickel-metal hydride secondary battery has a structure in which an electrode group 103 is accommodated in a cylindrical metal case 102 having a jutted portion 101 in the upper opening portion, and an asphalt sealing agent is coated on the inner surface of the jutted portion 101. The electrode group 103 is made of a laminated structure 108 constituted by a positive electrode 105 connected to one end of a lead wire 104 and containing nickel hydroxide as an active substance, a negative electrode 106 containing a hydrogen-absorbing alloy as an active substance, and a separator 107 (consisting of unwoven fabric of graft polymer made from polypropylene fiber and acrylic acid monomer) interposed between the positive and negative electrodes 105 and 106. The electrode group 103 is formed by spirally winding this laminated structure 108.

Each secondary battery containing no electrolyte is housed in the housing member 69 of the holding means 59. The holder 65 of the holding means 59 of each of the electrolyte injection mechanisms 54 to 57 is pulled up along the two guide bars 64a and 64b against the biasing force of the two coil springs 66a and 66b, placing the housing member 69 housing the secondary battery containing no electrolyte on the support plate 68. Thereafter, the force for pulling up the holder 65 is removed. Consequently, the holder 65 is biased downward by the two coil springs 66a and 66b, and the jutted portion 101 of the case 102 abuts against the lower surface of the packing 76, in FIG. 8. Therefore, as in FIGS. 7 and 8, the lower opening portion of the exit hole 79 of the nozzle 80 of the injection member 60 is positioned apart from the upper end of the electrode group 103 by a distance $l_2$ (e.g., 0.5 mm). This makes it possible to prevent the separator 107 from clogging up the exit hole 79.

As shown in FIG. 8 discussed above, while the exit hole 77 of the funnel 78 is closed with the tapered pin 85 of the opening/closing means 61, the valve 90 of the evacuating means 62 of each of the electrolyte injection mechanisms 54 to 57 is opened, and the vacuum pump is driven. Consequently, the case 102, the distal end of the exit hole 77 of the funnel 78, the nozzle 80, and the hollow portion 72 of the holder 65 are evacuated to, e.g., 110 torr. Thereafter, the valve 90 is closed and then the operation of the vacuum pump is stopped.

AS illustrated in FIG. 7 mentioned above, the nozzle of the electrolyte supply means 91 is inserted into the nozzle insertion hole 87 of the electrolyte injection mechanism 55 to supply an alkaline electrolyte consisting of potassium hydroxide to the funnel 78. Subsequently, the disk 51 is rotated, e.g., counterclockwise intermittently by 90° each time to insert the nozzle of the electrolyte supply means 91 into the nozzle insertion holes 87 of the electrolyte injection mechanisms 54, 57, and 56 in this order, thereby supplying the alkaline electrolyte to each funnel 78. Since the exit hole 77 is closed by the tapered pin 85, the alkaline electrolyte supplied to the funnel 78 of each of the electrolyte injection mechanisms 54 to 57 remains in the funnel 78 without leaking outside through the exit hole 77.

When the holding of the secondary batteries containing no electrolyte, the evacuation of the cases 102 of the secondary batteries, and the supply of the alkaline electrolyte to the injection members 60 are completed as described above, the disk 51 is rotated continuously. As the rotating speed increases, a centrifugal force acts more and more on the injection member 60 and the case 102 of each of the electrolyte injection mechanisms 54 to 57. As a consequence, each injection member 60 is so tilted as to be separated away from the disk 51 and assumes a nearly horizontal position as in FIG. 11. When the speed of the disk 51 reaches a predetermined value, the driving member is driven to remove the tapered portion of the tapered pin 85 from the exit hole 77 of the funnel 78, opening the exit hole 77. When the injection member 60 assumes this horizontal position and the exit hole 77 is open, a negative pressure is set in the case 102, and the centrifugal force is acting on the case 102. Therefore, the alkaline electrolyte contained in the funnel 78 smoothly and rapidly penetrates into the electrode group 103 through the exit hole 77, the internal hole 79a, and the exit hole 79. Consequently, the alkaline electrolyte is injected into each secondary battery at a high accuracy. During the injection, splash of the alkaline electrolyte passing through the exit hole 79 is prevented, and this avoids adhesion of the alkaline electrolyte to the sealing agent coated on the inner surface of the jutted portion 101.

When the rotating velocity of the disk 51 is decreased gradually after the injection of the alkaline electrolyte, the centrifugal force acting on the electrolyte injection mechanisms 54 to 57 weakens slowly. Accordingly, the mechanisms 54 to 57 are gradually moved downward to return to the state in which each mechanism is suspended from the two support rods 58a and 58b of the disk 51 as in FIG. 7. When the rotation of the disk 51 is stopped, the driving member is driven to insert the tapered portion of the tapered pin 85 into the exit hole 77 of the funnel 78, thereby closing the exit hole 77.

When the injection of the electrolyte is completed, the holder 65 of each of the electrolyte injection mechanisms 54 to 57 is pulled up along the two guide bars 64a and 64b, and the housing members 69 housing the secondary batteries supplied with the electrolyte are collected.

Figure 12:
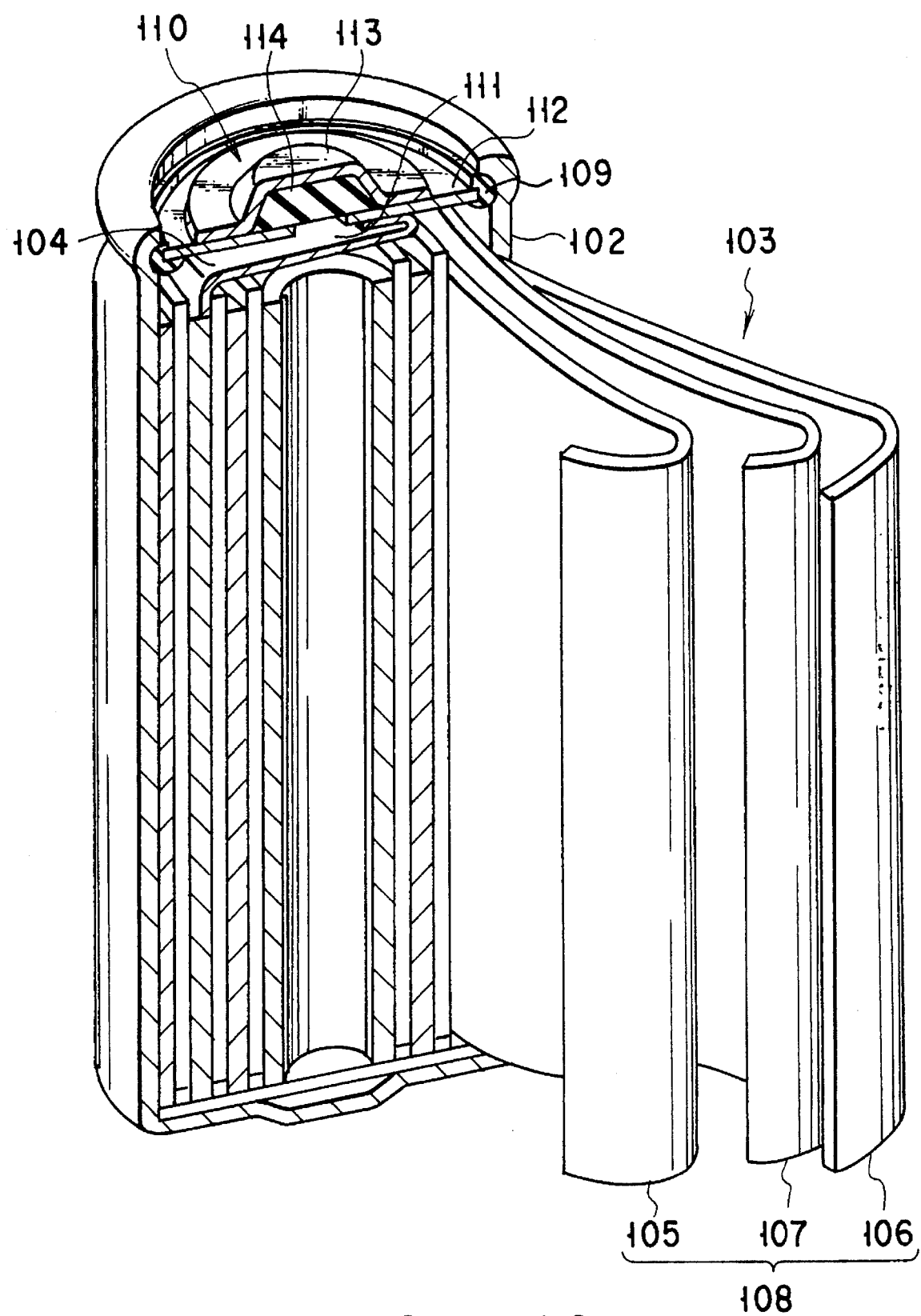
FIG. 12 is a perspective view showing a nickel-metal hydride secondary battery as one example of a battery into which an electrolyte is injected by the electrolyte injection apparatus in FIG. 7.

Each secondary battery removed from the apparatus and already supplied with the electrolyte was used to assemble a nickel-metal hydride secondary battery. More specifically, as shown in FIG. 12, a ring-like insulating gasket 109 was placed on the lower end of the jutted portion 101, a sealing lid group 110, which also performs the explosion-preventing function and acts as a terminal of the positive electrode, was placed on the insulating gasket 109, and the sealing lid group 110 was airtightly mounted on the case 102 by caulking. The sealing lid group 110 in FIG. 12 includes a circular sealing plate 112, a hat-like positive terminal 113, and a rubber safety valve 114. The sealing plate 112 has a hole 111 in the center, and the positive terminal 113 is so mounted on the sealing plate 112 as to cover the hole 111. The safety valve 114 is arranged in the space enclosed by the sealing plate 112 and the positive terminal 113 so as to close the hole 111. The other end of the positive lead 104 is connected to the lower surface of the sealing plate 112.

The electrolyte injection apparatus with the above construction can inject a predetermined amount of the electrolyte into the case 102 at a higher accuracy within a shorter time period than in the apparatus of Example 1. Also, since the injection can be done within a short time period, the efficiency of the electrolyte injection operation can be improved, and this results in an improved productivity of batteries. Furthermore, it is possible to avoid splash of the electrolyte contained in the funnel 78 and adhesion of the electrolyte to the sealing agent coated on the inner surface of the jutted portion 101 when the electrolyte is injected into the case 102 through the exit hole 79 of the nozzle 80. Consequently, it is possible to improve the airtightness of the battery assembled by the above-mentioned method after the electrolyte is injected, resulting in an improved reliability of the battery.

In Examples 1 and 2 discussed above, the present invention is applied to a cylindrical nickel-metal hydride secondary battery including an electrode group formed by winding a laminated structure in which a separator is interposed between positive and negative electrodes, as in FIGS. 6 and 12. However, the present invention is similarly applicable to a rectangular nickel-metal hydride secondary battery including an electrode group formed by overlapping a plurality of such laminated structures.

In Examples 1 and 2, the present invention is applied to a nickel-metal hydride secondary battery. However, the present invention is similarly applicable to a lithium ion secondary battery.

In Examples 1 and 2, the injection member consists of the funnel including the nozzle. However, the injection member can consist of a funnel including no nozzle.

Also, in Example 2, the tapered pin of the opening/closing means is reciprocated vertically by the air cylinder. However, this reciprocal motion of the tapered pin can also be performed by using a cam mechanism as a driving source.

As has been discussed in detail above, one electrolyte injection apparatus of the present invention can accurately inject a predetermined amount of an electrolyte into a battery containing no electrolyte, and can also improve the reliability of the battery. The other electrolyte injection apparatus of the present invention can inject a predetermined amount of an electrolyte into a battery containing no electrolyte at a higher accuracy within a shorter time period, than in the former apparatus, and can also improve the reliability of the battery. Furthermore, the productivity of batteries can be improved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed:

1. An electrolyte injection apparatus comprising:

a rotary table;

an electrolyte injection member supported by said rotary table so as to be tilted by a centrifugal force upon rotation of said rotary table, said injection member having an internal hole whose bottom section is tapered, and a small-diameter exit hole formed in a lower end thereof and communicating with said internal hole;

a battery which contains no electrolyte and in which an electrode group consisting of a laminated structure formed by interposing a separator between positive and negative electrodes is accommodated in a case such that a lamination plane of said electrode group is parallel to a direction of depth of said case;

holding means for holding said battery; and electrolyte supply means for supplying an electrolyte to said injection member;

wherein said holding means holds said battery below said injection member such that a lower region of said exit hole of said injection member is situated inside an opening of said case of said battery, with a desired distance maintained between the lower region of said exit hole and an upper end of said electrode group.

2. An apparatus according to claim 1, wherein said electrode group has an arrangement in which said laminated structure is spirally wound.

3. An apparatus according to claim 1, wherein said electrode group has an arrangement in which a plurality of said laminated structures overlap each other.

4. An apparatus according to claim 1, wherein said electrolyte is an alkaline electrolyte.

5. An apparatus according to claim 4, wherein said positive electrode contains nickel hydroxide as an active substance, and said negative electrode contains a hydrogen-absorbing alloy as an active substance.

6. An apparatus according to claim 1, wherein the distance between the lower opening portion of said exit hole of said injection member and the upper end of said electrode group is 0.5 to 1.0 mm.

7. An apparatus according to claim 1, wherein said holding means comprises: a holding jig for holding the battery; a support rod having a lower end coupled to the holding jig; a support jig, coupled to the support rod to be vertically movable, for supporting the injection member; a stopper for restricting downward movement of the support jig coupled to the support rod; and urging means for urging the support jig toward the stopper; and wherein said lower region of the exit hole of the injection member is situated inside said opening of the case of the battery, with said desired distance maintained between the lower region of the exit hole and said upper end of said electrode group, by lifting the support jig, which supports the injection member, along the support rod, maintaining a sufficiently long distance between the holding jig and the lower end of the injection member, placing the battery on the holding jig, and permitting the urging means to move the support jig downward while simultaneously restricting the downward movement of the support jig by means of the stopper.

8. An electrolyte injection apparatus comprising:

a rotary table;

an electrolyte injection member supported by said rotary table so as to be tilted by a centrifugal force upon rotation of said rotary table, said injection member having an internal hole whose bottom section is tapered, and a small-diameter exit hole formed in a lower end thereof and communicating with said internal hole;

a battery which contains no electrolyte and in which an electrode group consisting of a laminated structure formed by interposing a separator between positive and negative electrodes is accommodated in a case such that a lamination plane of said electrode group is parallel to a direction of depth of said case;

opening/closing means for opening/closing said exit hole of said injection member;

holding means for holding said battery;

evacuating means for evacuating said case; and electrolyte supply means for supplying an electrolyte to said injection member;

wherein said holding means holds said battery below said injection member such that a lower region of said exit hole of said injection member is situated inside an opening of said case of said battery, with a desired distance maintained between the lower region of said exit hole and an upper end of said electrode group.

9. An apparatus according to claim 8, wherein said electrode group has an arrangement in which said laminated structure is spirally wound.

10. An apparatus according to claim 8, wherein said electrode group has an arrangement in which a plurality of said laminated structures overlap each other.

11. An apparatus according to claim 8, wherein said electrolyte is an alkaline electrolyte.

12. An apparatus according to claim 11, wherein said positive electrode contains nickel hydroxide as an active substance, said negative electrode contains a hydrogen-absorbing alloy as an active substance, and said separator is polyolefin fiber unwoven fabric having a hydrophilic functional group.

13. An apparatus according to claim 8, wherein the distance between the lower opening portion of said exit hole of said injection member and the upper end of said electrode group is 0.5 to 1.0 mm.

14. An apparatus according to claim 8, wherein said opening/closing means has a tapered pin arranged in said injection member and adapted to move along an axial direction of said injection member so as to open/close said exit hole.

15. An apparatus according to claim 8, wherein said holding means comprises: a holding jig for holding the battery; a support rod having a lower end coupled to the holding jig; a support jig, coupled to the support rod to be vertically movable, for supporting the injection member; a stopper for restricting downward movement of the support jig coupled to the support rod; and urging means for urging the support jig toward the stopper; and wherein said lower region of the exit hole of the injection member is situated inside said opening of the case of the battery, with said desired distance maintained between the lower region of the exit hole and said upper end of said electrode group, by lifting the support jig, which supports the injection member, along the support rod, maintaining a sufficiently long distance between the holding jig and the lower end of the injection member, placing the battery on the holding jig, and permitting the urging means to move the support jig downward while simultaneously restricting the downward movement of the support jig by means of the stopper.

* * * * *